No. 804,674. PATENTED NOV. 14, 1905.
W. A. ROBBINS.
SHOE TREAD.
APPLICATION FILED MAR. 31, 1905.

Witnesses:
Horace A. Crossman
Everitt S. Emery

Inventor:
William A. Robbins.
by Emery Booth & Varney
Attys

UNITED STATES PATENT OFFICE.

WILLIAM A. ROBBINS, OF TRENTON, NEW JERSEY.

SHOE-TREAD.

No. 804,674.     Specification of Letters Patent.     Patented Nov. 14, 1905.

Application filed March 31, 1905. Serial No. 253,023.

*To all whom it may concern:*

Be it known that I, WILLIAM A. ROBBINS, a citizen of the United States, and a resident of Trenton, in the county of Mercer and State of New Jersey, have invented an Improvement in Shoe-Treads, of which the following description, in connection with the accompanying drawings, is a specification, like numerals on the drawings representing like parts.

My invention relates to shoes having waterproof tread members, and particularly to those the tread-faces of which are provided with reinforced wear-resisting areas.

The aim of the invention is to provide a secure union between the reinforcing element and the body of the tread member and to increase the wear-resisting qualities of the shoe.

The nature of the invention will be apparent from a description of the particular embodiment thereof which has been selected herein for illustration, and its scope will be pointed out in the appended claims.

Figure 1:
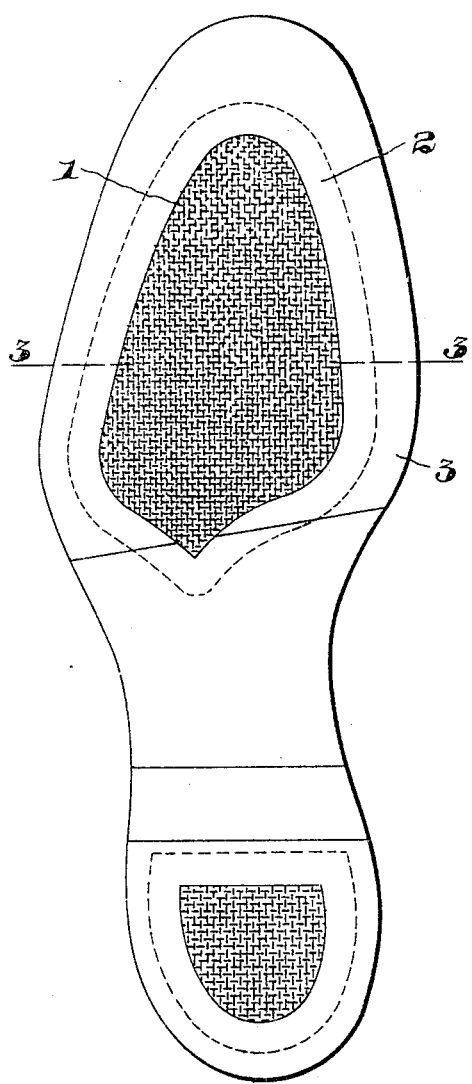
Figure 2:
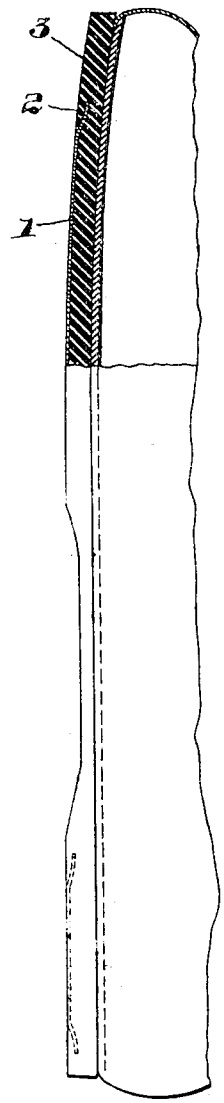
Figure 3:
Figure 4:
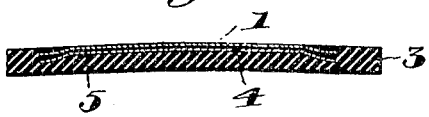

In the drawings, Figure 1 is a bottom plan view of a shoe, illustrating my invention. Fig. 2 is a side elevation, partly in section, of a portion of a shoe, showing the arrangement of the reinforcing element within the tread member. Fig. 3 is a sectional view on the line 3 3, Fig. 1; and Fig. 4 is a view similar to Fig. 3 of a modification of the invention.

In the art of manufacturing shoes having waterproof tread members it is a well-known expedient to provide the latter with reinforced areas of fabric or other wear-resisting material. In some instances the reinforcing material is secured in recesses in the tread-face of the tread member, whose side walls are perpendicular, or approximately so, to said face. Pressure upon said tread-face in use tends to separate the edges of the reinforcing material from said walls, thus permitting the entrance of dirt between the two and resulting in a material weakening of the connection and sometimes ultimately in the entire separation of the reinforcing element from the body of the tread member. To obviate this defect and to increase the wearing qualities of such shoes generally, I have devised a construction in which the reinforcing material has its perimeter firmly embedded in the composition of the tread member.

In the practice of my invention a blank of fabric or other suitable material is cut to the desired shape to form the reinforcing element 1. A layer of desired thickness of the rubber or other compound to form the body of the tread member is placed within a suitable mold, the center of said layer being built up or made thicker than its edges. The reinforcing-blank is then placed upon this layer, and strips or portions of the compound are placed upon and to a desired distance within the perimeter of the reinforcing element to bring the edges of the tread member up to the combined thickness of the reinforcing layer and the built-up or thicker central body portion. The whole is then subjected to pressure and heat sufficient to effect the usual hardening or vulcanization.

In the molding process the reinforcing material becomes firmly cemented to and its perimeter securely embedded within the composition body of the tread member, whereby the latter possesses all the advantages of the usual reinforced tread-surface, while at the same time loosening of the edges of the reinforcing material, with the resulting impairment of the durability of the tread member, is entirely obviated.

The wear-resisting qualities of the tread member may be further augmented, if desired, by the use of a plurality of reinforcing layers, as shown in Fig. 4, whereby when an outer layer is worn through the layers therebeneath will maintain the durability of the tread member. In order to strengthen the anchorage of the superposed layers in this modified form of the invention, the perimeters thereof, as shown, may be spaced apart and independently embedded within the body of the tread. Furthermore, a thin film 4 of the body composition may be interposed between the layers 1 and 5 of the reinforcing material, whereby in the molding process the outer layer of fabric may be as securely cemented throughout its area to the body of the tread member as those beneath. It is obvious that reinforcing elements of the above description are equally adapted to be used as well within the tread-surface of the heel as the sole of a tread member, such use being illustrated in Fig. 1 of the drawings.

Other changes may be made in the construction and arrangement of parts without departing from the spirit and scope of the invention.

I claim—

1. As a new article of manufacture a tread member for a shoe provided at its tread-surface with a wear-resisting element of flexible material presenting an exposed area and having its perimeter bent and embedded in the substance of the tread member and beneath said surface.

2. As a new article of manufacture a tread member for a shoe provided at its tread-surface with a wear-resisting element comprising a layer of fabric presenting an exposed area and having its perimeter bent and embedded in the substance of the tread member and beneath said surface.

3. As a new article of manufacture, a tread member for a shoe, provided with a wear-resisting element at its tread-surface comprising a plurality of layers of wear-resisting material, said element presenting an exposed area and having its perimeter embedded beneath said surface.

4. As a new article of manufacture, a tread member for a shoe, provided with a wear-resisting element at its tread-surface comprising a plurality of layers of fabric, said element presenting an exposed area and having the perimeters of its separate layers separately embedded beneath said surface.

5. As a new article of manufacture, a composite tread member for a shoe having a plurality of superposed layers of fabric embedded within its tread-surface and separated one from another by the composition of said member, the outside layer presenting an exposed area and having its perimeter embedded beneath said surface.

In testimony whereof I have signed my name to this specification in the presence of two subscribing witnesses.

WILLIAM A. ROBBINS.

Witnesses:
　Lois E. Robbins,
　L. Bodenstien.